United States Patent [19]

Walker

[11] 3,750,004

[45] July 31, 1973

[54] INSTANTANEOUS CURRENT CONTROL FOR STATIC INVERTERS

[75] Inventor: Loren H. Walker, Raleigh, N.C.

[73] Assignee: ESB Incorporated, Philadelphia, Pa.

[22] Filed: Feb. 23, 1972

[21] Appl. No.: 228,632

[52] U.S. Cl. .................. 321/14, 321/5, 321/9 R, 321/27 MS, 321/DIG. 1
[51] Int. Cl. ......................................... H02m 1/18
[58] Field of Search .................. 321/5, 9 R, 11-14, 321/18-19, 27 MS, DIG. 1; 318/227, 230

[56] References Cited
UNITED STATES PATENTS

| 3,609,507 | 9/1971 | Beck | 321/14 X |
| 3,614,590 | 10/1971 | Kernick | 321/14 X |
| 3,500,166 | 3/1970 | Mesenhimer et al. | 321/11 |
| 3,247,447 | 4/1966 | Flairty | 321/14 |

FOREIGN PATENTS OR APPLICATIONS

| 864,673 | 2/1971 | Canada | 321/14 |

Primary Examiner—William H. Beha, Jr.
Attorney—Robert H. Robinson, Anthony J. Rossi et al.

[57] ABSTRACT

An improvement is made to stepped wave static inverters in the form of an instantaneous current control circuit. In case of overload of faults on the inverter output, this circuit acts to limit current in the power switching devices of the inverter. Its performance is an improvement over previous current limit circuits in that it acts instantly to limit overload current and instantly to release that limit so that normal output voltage is restored immediately when the overload is removed. A furtheperformance improvement results because this circuit acts to limit current in the individual power switching devices without necessarily reducing the output voltage of all phases of the inverter.

9 Claims, 21 Drawing Figures

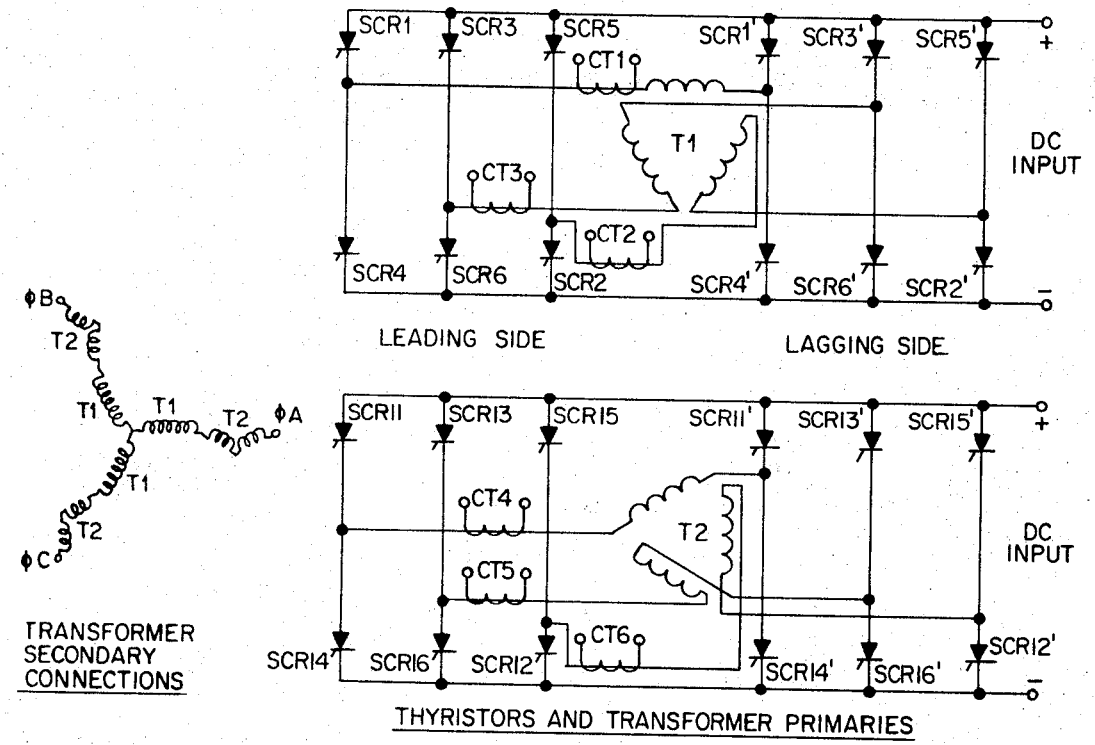
Fig. 5
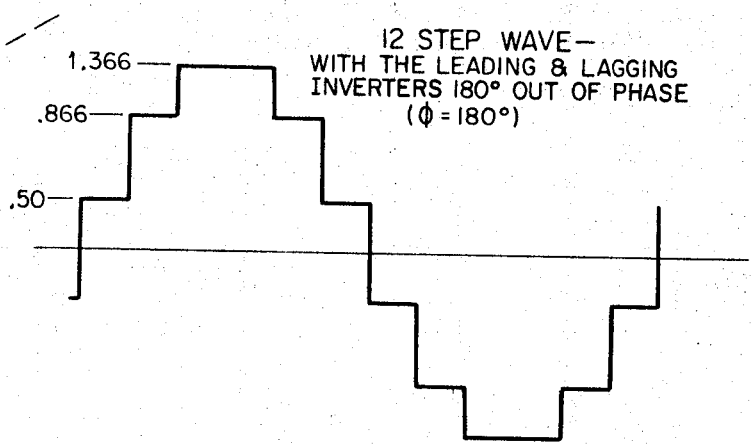
12 STEP WAVE—
WITH THE LEADING & LAGGING
INVERTERS 180° OUT OF PHASE
(φ = 180°)
Fig. 5(a)
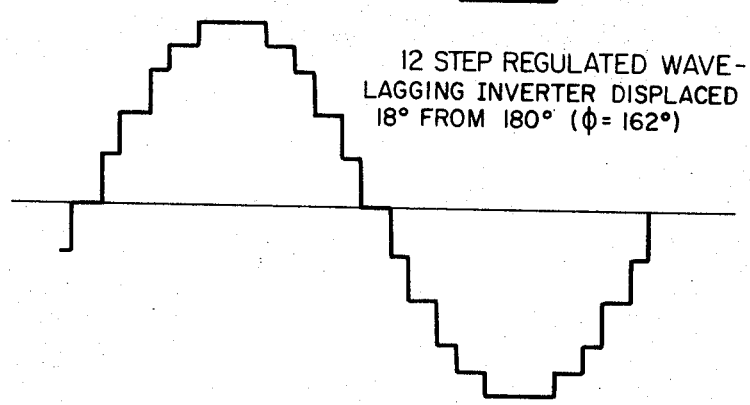
12 STEP REGULATED WAVE—
LAGGING INVERTER DISPLACED
18° FROM 180° (φ = 162°)

SINGLE-PHASE BRIDGE INVERTER

OPERATING WAVEFORMS WITH FAULT APPLIED

*=ACTIONS OF FAULT CURRENT CONTROL

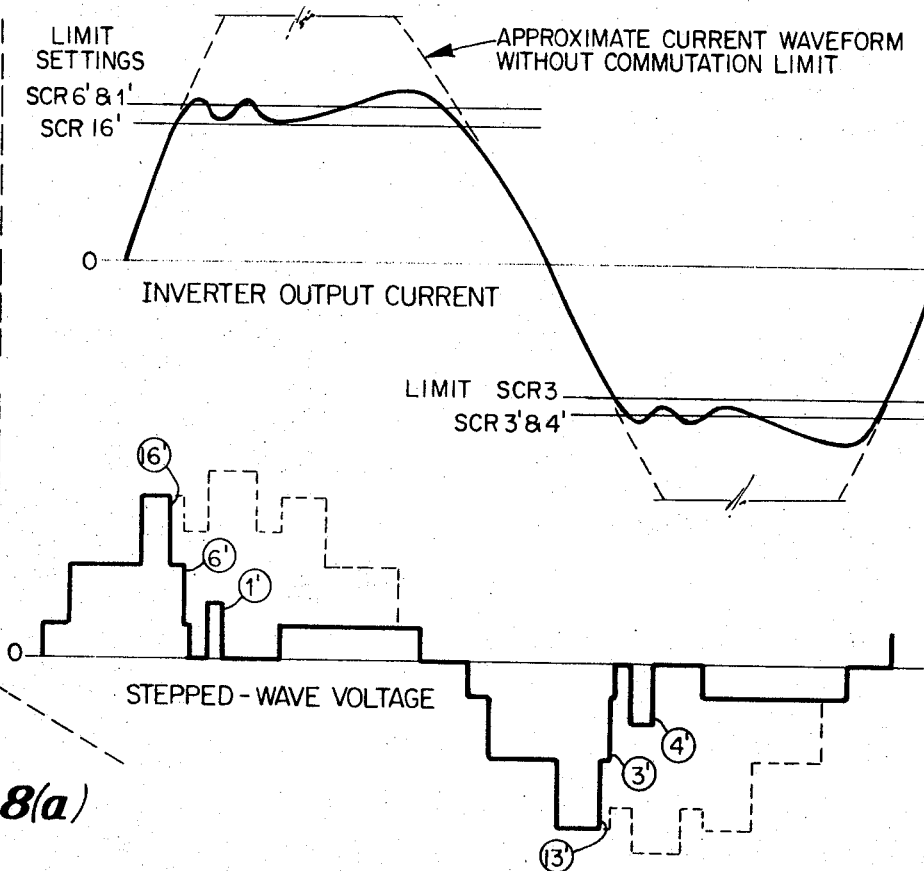
Fig. 8
Fig. 8(a)
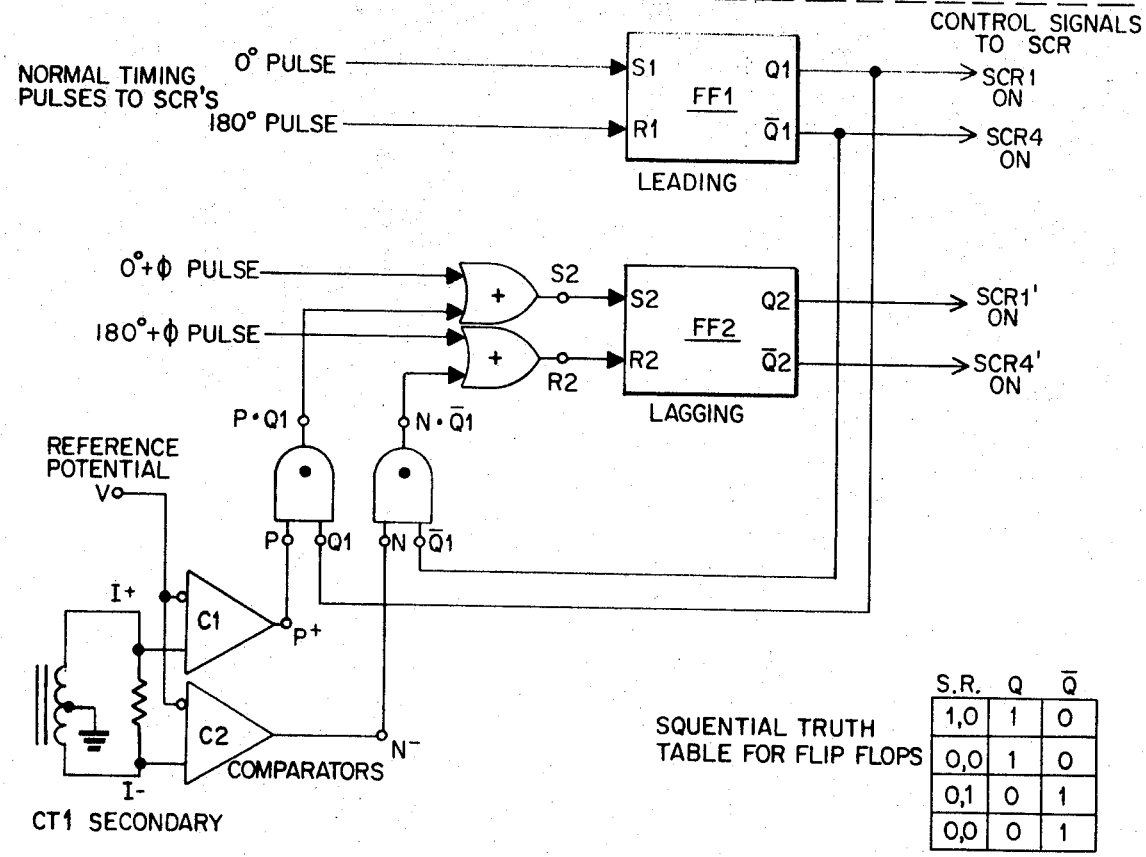

INSTANTANEOUS CURRENT CONTROL FOR STATIC INVERTERS

BACKGROUND OF THE INVENTION

1. Field of the Invention

This invention relates to solid state inverters. More particularly it relates to inverters utilizing silicon controlled rectifiers (SCR) which have the capability for rapidly clearing load faults.

2. Description of the Prior Art

It may be explained here that in applications of uninterruptible power systems (UPS) to large critical loads, a requirement for rapid clearing of load faults is often necessary.

In a great majority of installations of large UPS equipments, a digital computer is a part of the load to be powered. Computers and their peripherals may be quite sensitive to power line dips or outages. Typical specifications for voltage dips to a critical load require that deep voltage dips last no longer than 2 milliseconds (see FIG. 1). The purpose of installing the UPS is to isolate the critical load from the voltage dips and outages which occur on utility lines. The static UPS, consisting of a battery, rectifier battery charger, and a thyristor inverter, is ideally suited to this purpose.

Having committed the critical load to the UPS, the computer user has subjected himself to a new class of voltage dips at the critical load. These are the dips due to faults in the critical load itself. FIG. 2 shows a one line diagram which might be a portion of a real time computer installation. A fault in any of the various loads such as the one shown at Memory No. 3 may draw an extremely large current until its protective fuse or circuit breaker can open. In order to prevent such a failure in one piece of critical load equipment from disturbing the rest of the critical loads, it is necessary that the load fault be cleared quickly before the voltage dip exceeds the limits of FIG. 1.

When the critical load is supplied from the utility, a large fault current is available at a minimum of voltage dip. A typical utility feeder with 3 percent impedance will deliver 1000 percent of rated current while voltage dips to 70 percent of normal. If the various portions of the critical load are protected by current limiting fuses, the large available current will assure that the fuse will clear quickly and the fault will be isolated within the two millisecond duration specified.

If the power source is a UPS, however, large fault currents are not available. It is a characteristic of thyristor inverters that there is a certain instantaneous peak current which can be carried (commutated). This current is typically in the range of twice rated peak current. If this current is exceeded even transiently, the inverter will be subject to a commutation failure or shoot-through. The commutation failure places a short across the battery which must be cleared by current limiting fuses in the inverter cabinet. In order to prevent commutation failures, the UPS must have some feature to limit output current by depressing out voltage quickly. The maximum short circuit current of UPS inverters will be limited by this feature to about 175 percent or rated. Thus when a load fault occurs while the critical load is powered by the UPS, the fault current will be much smaller and the voltage dip will be much deeper than the utility lines would provide.

In order to meet voltage dip limits as shown in FIG. 1 in the event of a low impedance fault in the UPS load, the distribution fuses must be much faster than those which would be satisfactory on utility power. The selection of a proper fuse rating requires close coordination between the characteristics of the fuse and the fault current response of the inverter. In some UPS inverters, the largest fuse which can be cleared within the voltage dip limits may be as small as 10 percent of the UPS rating. By selecting the proper approach to fault current control in the UPS inverter, the largest fuse may be increased to 25 percent or more of the UPS rating. A UPS installation using an inverter with good fault clearing response and properly coordinated fuses can meet the goal of providing uninterruptible power to the critical load during faults in the critical load.

Approaches to Fault Current Control

There are several approaches now in use to meet limits such as are shown in FIG. 1 in case of faults in the critical load.

Static Transfer to Line

One method which has been successful in the rapid clearing of faults is to sense the fault current and promptly transfer the critical load from the UPS to the utility source. The high fault current capability of the utility lines clears the fault promptly. After the fault is cleared, the load is retransferred to the UPS output. Although this solution has been applied successfully in many installations, it is not applicable in all installations. It requires that the UPS inverter be continually synchronized with the utility. It also requires a static transfer switch (thyristors) capable of withstanding the fault current the utility can deliver. This may be impractical.

High Impedance Filter

Many older design single phase inverters use a high impedance output filter. This filter stores a great deal of energy and limits the rate of rise of load current passed through the filter to the inverter. If the fuse in the fault is fast enough, it can be blown by the stored energy in the filter before the fault current can build up in the inverter thyristors. This approach is not suited to large UPS applications because the high impedance filter causes large voltage dips on application of normal loads. The high impedance filter is also uneconomical in large ratings.

Ferroresonant Transformer

The inherent current limiting effect of a ferroresonant transformer has also been successfully used to limit inverter output current. It, too, is uneconomical, bulky, and inefficient in large ratings.

Control Approaches

Several approaches have been used in which thyristor firing is used to control fault currents. The design requirements on such an approach are stringent. The fault limiting function should:

A. Detect the fault quickly enough to reduce output voltage before the current gets too high for the inverter to commutate.

B. In accomplishing requirement A, avoid clamping the output voltage to zero or no fault current will be delivered. Do deliver full fault current within the first millisecond.

C. Detect immediately when the fault has cleared and restore output voltage within much less than 2 milliseconds. The two most commonly used approaches for fault current control in large UPS inverters and the impedance inserter and the fast current limit which acts through the inverter voltage regulating function. Each of these approaches has been successfully used in some installations, but neither meets all of the requirements.

Static Interrupter Impedance Inserter

A static interrupter impedance inserter consists of a fault limiting resistance shunted by a pair of anti-parallel thyristors with forced commutation. It is connected between the UPS and the load so that normal load current flows through the anti-parallel thyristors. When the fault occurs, the interrupter can be opened in a fraction of a millisecond by commutating the thyristors. The fault current delivered will then be controlled by the value of the resistor and the impedance of the fault. This approach meets the design requirements A and B in that it limits current immediately without reducing it to zero.

Design requirement C is harder to meet in this case because of the risk of commutation failure. When the fault is cleared by the branch fuse, the circuit should reapply gate pulses to the main thyristors in the static interrupter and restore normal voltage to the load. The problem which arises is that of determining when the fault has cleared. If the instantaneous load current drops below rated current, the circuit must distinguish between a normal zero crossing of the AC fault current and a true removal of the fault. The interrupter must not be allowed to reclose until it is certain that the fault is cleared or that the interrupter has regained its commutating capability and can reopen immediately if the fault has not cleared.

Acting Through the Voltage Regulator

Many inverter designs accomplish fault current limiting by a quick acting current limit which depresses output voltage on all phases when the fault is applied. This is difficult to do in an inverter with a small series filter. If the approach has been successful in meeting requirement A and preventing commutation failures, it usually fails to meet requirements B and C. The fault response is as shown in FIG. 3. When the fault is applied, the three phase output voltage is clamped to zero. As voltage is gradually restored, the fault current builds up to a value high enough to blow the fuse, but not within 2 milliseconds. When the fuse clears the fault, the regulator ramps rapidly back up to normal voltage. This rise in voltage must be slow enough to limit the voltage and to avoid saturating the inverter output transformers causing a commutation failure. Because of these limitations, the total time to clear the fault and restore normal voltage will seldom be less than 16 milliseconds and may be much longer.

SUMMARY OF THE INVENTION

The inverter in accordance with the invention uses a fault current control approach which changes the firing of the inverter thyristors to control fault current, rather than depending on an external static interrupter impedance inserter for this function. It does not, however, change the setting of the inverter voltage regulator during the fault. Rather, it uses a signal level "subcycle current control". This circuit senses instantaneous current at the inverter thyristors and changes the firing times of the overloaded thyristors to deliver maximum output current rather than normal output voltage. Those thyristors which are not overloaded by the fault remain under control of the voltage regulator.

The external performance features resulting from the mode of inverter control in accordance with the invention are shown on FIG. 4. The figure shows that:
1. Fault current greater than 1.75 times rated is delivered starting at the instant a fault is applied.
2. Voltage on the faulted phases is depressed only as far as necessary to limit fault current.
3. Voltage on the unfaulted phases is almost undisturbed by the fault.
4. Voltage on the faulted phase returns to normal immediately, on a subcycle basis, when the fault is cleared.

With these performance characteristics, the inverter can clear a dead fault and restore normal voltage within the time limits of FIG. 1. Branch fuse ratings up to 25 percent of total UPS capacity can be used and still meet FIG. 1 limits.

Briefly, the structural implementation of a preferred embodiment of the invention comprises in combination with an inverter of the type comprising a set of at least two single phase sub-inverters whose outputs are combined to form the total inverter output and which includes a multiphase transformer having primary and secondary windings and means to limit the instantaneous current of the subinverters to a predetermined value in the event of an overload in one or more of the sub-inverters, the improvement which comprises: means for modifying the operation of one or more of the sub-inverters in the event of an overload condition in one or more of the sub-inverters such as to limit the instantaneous current in the sub-inverters to a predetermined magnitude higher than said predetermined value during an overload condition in one or more of the sub-inverters. The means includes a plurality of current sensing means. Each current sensing means is operatively connected to a sub-inverter and each operatively connected in circuit with the primary winding of the multiphase transformer associated with each sub-inverter for sensing current at each sub-inverter.

The arrangement is such that the means is insensitive to total inverter output current and the total inverter output current may be safely considerably larger than said predetermined value than if the current sensing means were located in circuit with the secondary winding of the multiphase transformer associated with each sub-inverter and the means to limit the instantaneous current to a predetermined value was set to limit the instantaneous current in the most overloaded sub-inverter.

Other features and advantages of the present invention and a more complete understanding of the invention will become apparent from the following detailed description, taken in conjunction with the accompanying drawings which form a part of this specification. The drawings disclose by way of example and not by way of limitation, in a preferred embodiment, the principles of the invention and a structural implementation of the inventive concept.

BRIEF DESCRIPTION OF THE DRAWINGS

FIG. 5 is a diagrammatic or skeleton schematic of an inverter power circuit;

FIG. 5(a) illustrates the normal line-to-line output from the inverter of FIG. 5;

FIG. 8 illustrates the stepped wave voltage resulting when the current control described with reference to FIGS. 7, 7(a), 7(b) and 7(c) is applied to the individual sub-inverters of a stepped wave inverter;

FIG. 8(a) illustrates one implementation of the commutation limit in accordance with the invention; also shown is a sequential truth table for the flip-flops of FIG. 8(a);

DESCRIPTION OF THE PREFERRED EMBODIMENT

Figure 1:
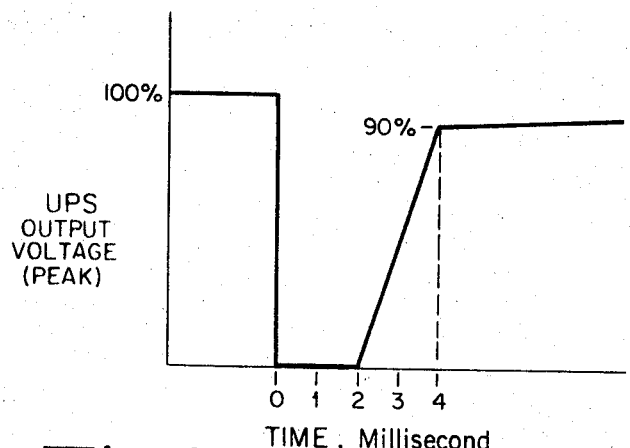
FIG. 1 illustrates a typical limit on voltage dip for computer loads.
Figure 2:
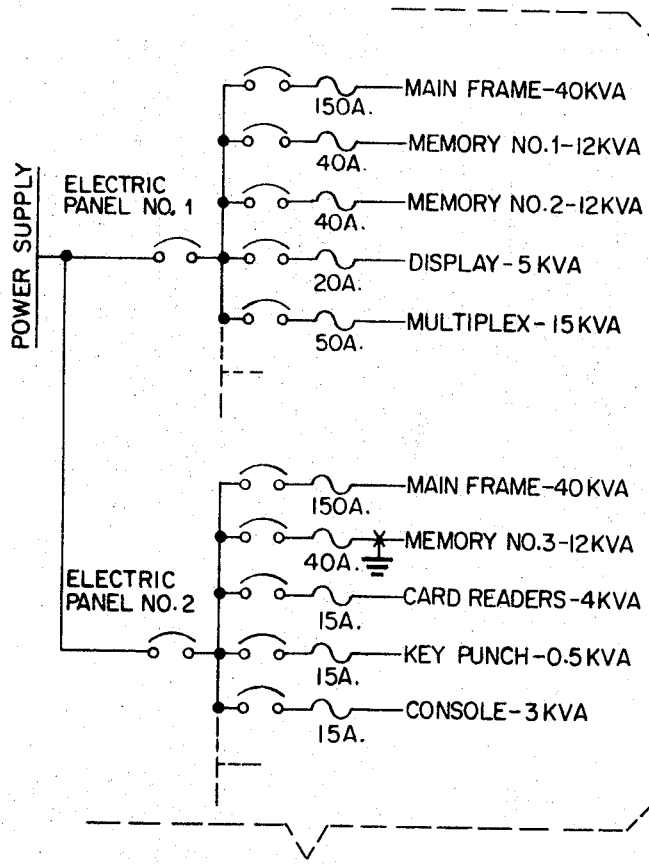
FIG. 2 illustrates a fault in one branch of a critical load distribution network.

Before discussing the operation of the subcycle current control in accordance with the invention, an outline of the general design and construction of the inverter with which it is used will first be given. While specific design figures are given below, these are given by way of example only. It is to be understood that the invention is applicable to larger as well as smaller inverter design ratings.

200 KVA INVERTER DESIGN

UPS Configuration

The UPS system in which this inverter is used has a rating of 200 KVA per module. Input and output voltage is three phase, 277/480 VAC, 60 Hertz. Battery voltage is 400 VDC nominal. The module configuration is of the floating battery continuous type with the battery always connected across the inverter input. The input rectifier is controlled to act as charger to the battery and simultaneously to supply the inverter during normal operation.

Inverter Configuration

The inverter power section is made up of 24 thyristors operated to form two conventional 12 step waves with first harmonic the 11th. For a more complete description of the power section, see the article by P.D. Corey, "Methods of Optimining the Waveform of Stepped-Wave Static Inverters", AIEE Paper CP62-1147, Denver, June 17-22, 1962. The two 12 step waves are operated at variable phase displacement from one another, and the resulting waves are combined to produce a three phase output wave whose amplitude is controlled by the value of the relative phase displacement.

The thyristors are controlled by an all digital logic control. This digital control precisely determines the firing of each thyristor based on a digital voltage command. The subcycle current control logic is a part of this digital control.

Power Circuit

The connection of the power components is a shown in FIG. 5. The schematic shown in FIG. 5 with the exception of the six current transformers CTI through CT6 illustrates the power stage configuration of a typical 12 stepped wave inverter. The 24 thyristors are arranged in four three phase bridge inverters. Within each three phase bridge the thyristors are fired at precisely 120° intervals. The two bridges associated with an output transformer are operated at variable phase with respect to one another, so that the voltage appearing on each transformer primary is a quasi-square wave of variable pulse width. The 12 thyristors associated with three transformer T2 are each fired at exactly 30° after the corresponding thyristor in the set of thyristors connected to transformer T1. The secondaries of the two transformers are combined in a zig-zag connection to construct a line-to-line voltage waveform of the desired step heights and times.

The power filter consists of a series inductance and parallel capacitance to attenuate the 11th, 13th, and higher harmonics. The series inductance is composed of the leakage reactance of the transformer and a small lumped reactance in each phase.

The normal output waveform of this inverter is shown in FIG. 5(a) which illustrates normal line-to-line output.

CONTROLS

Figure 6:
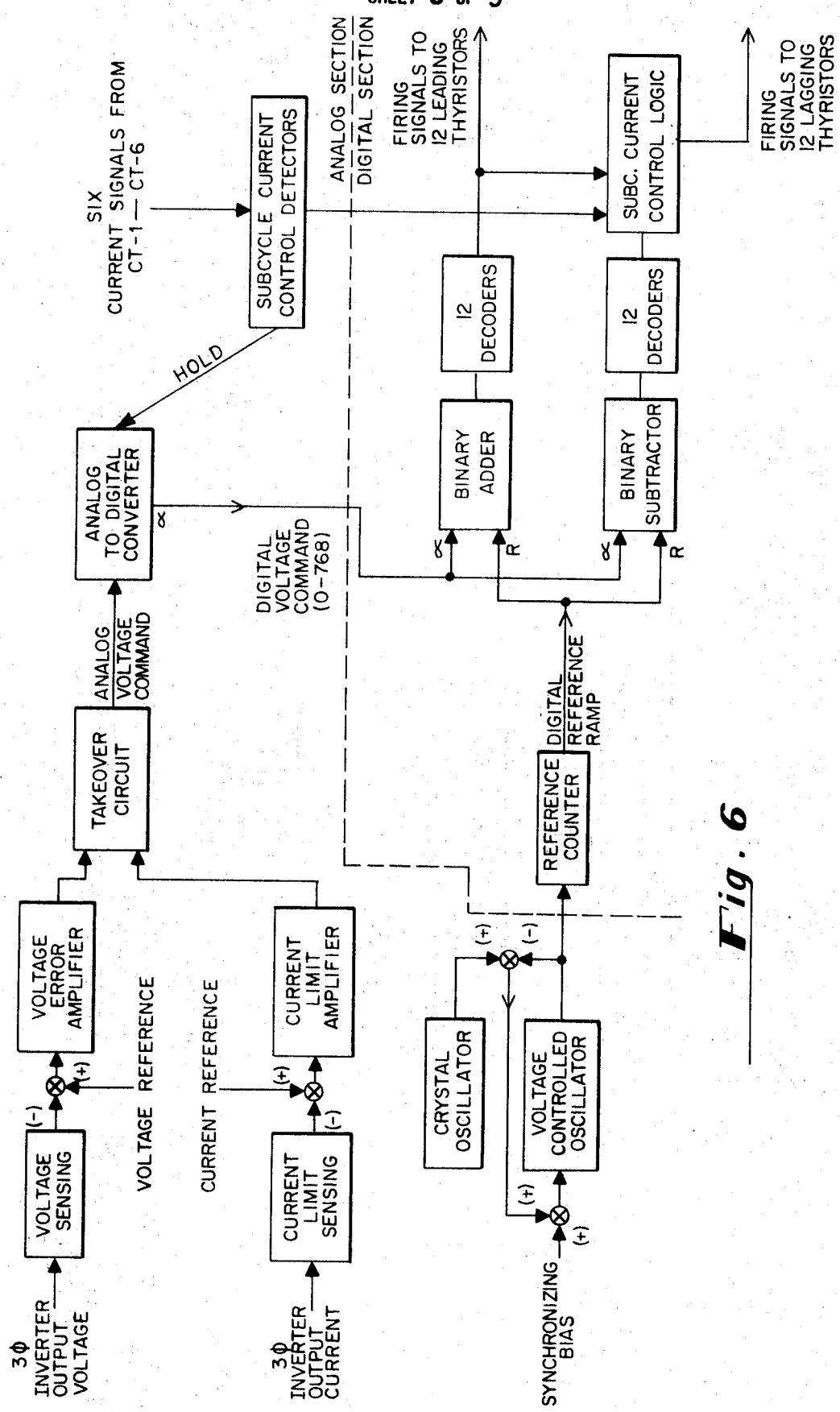
FIG. 6 illustrates a block diagram of inverter controls.

FIG. 6 shows a block diagram of the controls.

Analog Section

The inverter output voltage and current are sensed by normal analog means. The sensed voltage is compared to a reference, and the error voltage is amplified to become the voltage command. When the output current exceeds the current limit reference, the takeover circuit allows the current sensing to control the voltage command. This voltage command is changed to a digital number between zero and 768 by the analog-to-digital converter. This number determines the phase displacement between the two sets of stepped waves forming the output, and thus determines the output voltage magnitude.

Frequency Control

The frequency of inverter output is determined by a high frequency crystal referenced oscillator. If the frequency or phase of the inverter must be trimmed to match another source, the oscillator can be biased away from crystal frequency by ±2½ percent (± 1.5 Hz at 60 Hz) to accomplish this matching.

Subcycle Current Control

The subcycle current control does not act on the voltage command, but rather imposes changes in the thyristor firing signals after they have been determined by the voltage command and frequency reference. The "hold" signal from the subcycle current control causes the voltage control functions to maintain a constant stepping pattern when the subcycle current control is active.

Digital Section

The digital thyristor timing control takes the digital information from the frequency reference clock and from the digital voltage command and forms timing signals for firing the 24 thyristors. The output signals of the digital thyristor timing control consists of two sets of six square waves. Within each set the waves are separated by exactly 30° electrical °. The leading set is phased ahead of a reference phase by an electrical angle proportional to the voltage command, alpha. The lagging set is phased behind the reference by this same angle.

In order to form these gating signals, the 184 KHz frequency reference clock pulses are counted down to form a digital reference ramp which sweeps from zero to full count during each 16.667 millisecond cycle. The magnitude of the digital voltage command is continuously added to this digital reference ramp to form a displaced ramp. Twelve decoders monitor this displaced ramp to select times for firing the 12 leading thyristors.

For the 12 lagging thyristors, the digital voltage command is subtracted from the reference ramp and the resulting displaced ramp is decoded by circuitry identical to that on the leading side. The subcycle current control logic is interposed between the lagging decoders and the gating signals. In normal operation the subcycle current control logic passes these signals unchanged.

Logic Hardware

Although the operation of the digital logic is precise and of high resolution, it is not complex to implement. The digital blocks are chosen to use standard T²L complex function logic. These standard logic functions are available in dual in-line packages from several vendors. The total thyristor timing logic including subcycle current control is built on three 8 inch square printed circuit boards.

Current Control in Overloads

A major advantage of the all-digital thyristor control is the flexibility it allows in the control of overload currents. Two current control features are shown in FIG. 6, a slow current limit and the subcycle current control. The slow current limit acts to limit long-term overload current to 150 percent of inverter rated current. It acts through the voltage regulating path to reduce the output voltage of all three phases when load current exceeds the limit setting. It is intentionally delayed so that it will have no effect on inverter output for the first 300 milliseconds (18 cycles) of an overload or fault.

The subcycle current control function is instantaneous in action. It senses currents at the inverting thyristors and intervenes in the logic to control the firing of the lagging thyristors to limit instantaneous current to a value which can be commutated. It does not affect the firing times of all the lagging thyristors, but only those which must be changed in order to maintain commutation margin.

Concept of the Subcycle Current Control

In order to discuss the operation of the subcycle current control, it is necessary to visualize the power section as comprising six single phase bridge inverters or sub-inverters. Referring to FIG. 5, it can be seen that the four thyristors SCR1, SCR4, SCR1', and SCR4' are connected to the two ends of a transformer winding. There are no other thyristors connected to this winding, so these four can be considered as a single phase bridge inverter as shown in FIG. 7.

Figure 7:
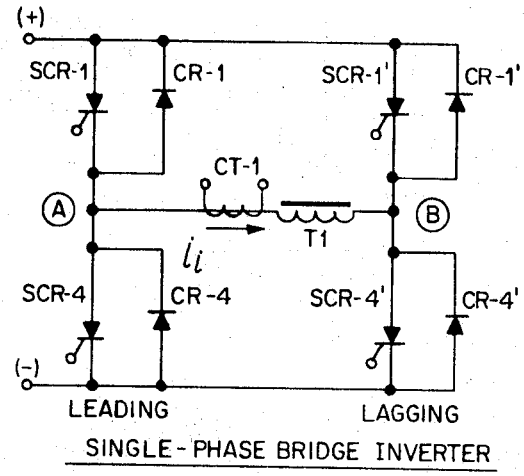
FIG. 7 illustrates a single phase bridge inverter showing operation of instantaneous fault current control.

Each single phase bridge inverter would be identical to that shown in FIG. 7 if so drawn. Shown in FIG. 7 are the reverse diodes (CR-1, CR-1', CR-4 and CR-4') in parallel with each SCR which are not shown in FIG. 5, but are essential to operation of the inverter. Not shown in FIG. 5 or 7 are the commutating circuits necessary to turn off the inverter SCR's. Many commutating circuit configurations would be suitable.

Figure 7A:
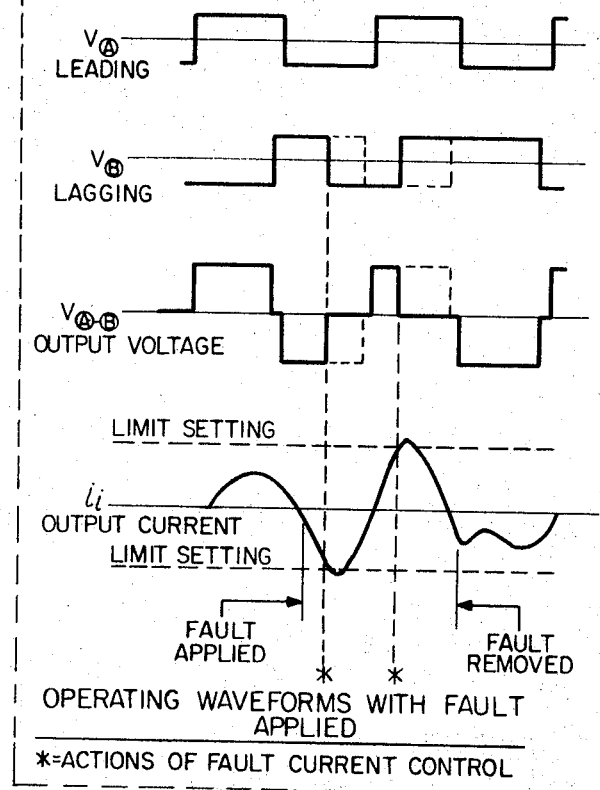
FIG. 7(a) illustrates the operation of a single phase inverter of the type shown in FIG. 7 utilizing a prior art method of instantaneous current limit.

Many single phase inverters have been built of a single bridge inverter such as shown in FIG. 7. Many of these inverters have been protected from faults by a fast acting current limit which senses current in the position of CT1 and terminates the quasi-square wave pulse at the instant load current exceeds a pre set value. As for example, see U.S. Pat. No. 3,378,751 to L.H. Walker. FIG. 7(a) shows the operation of such a single phase inverter using this method of instantaneous current limit. The lagging side thyristors are caused to commutate at the instant the current exceeds the limit value, thus terminating the power pulse.

Figure 7B:
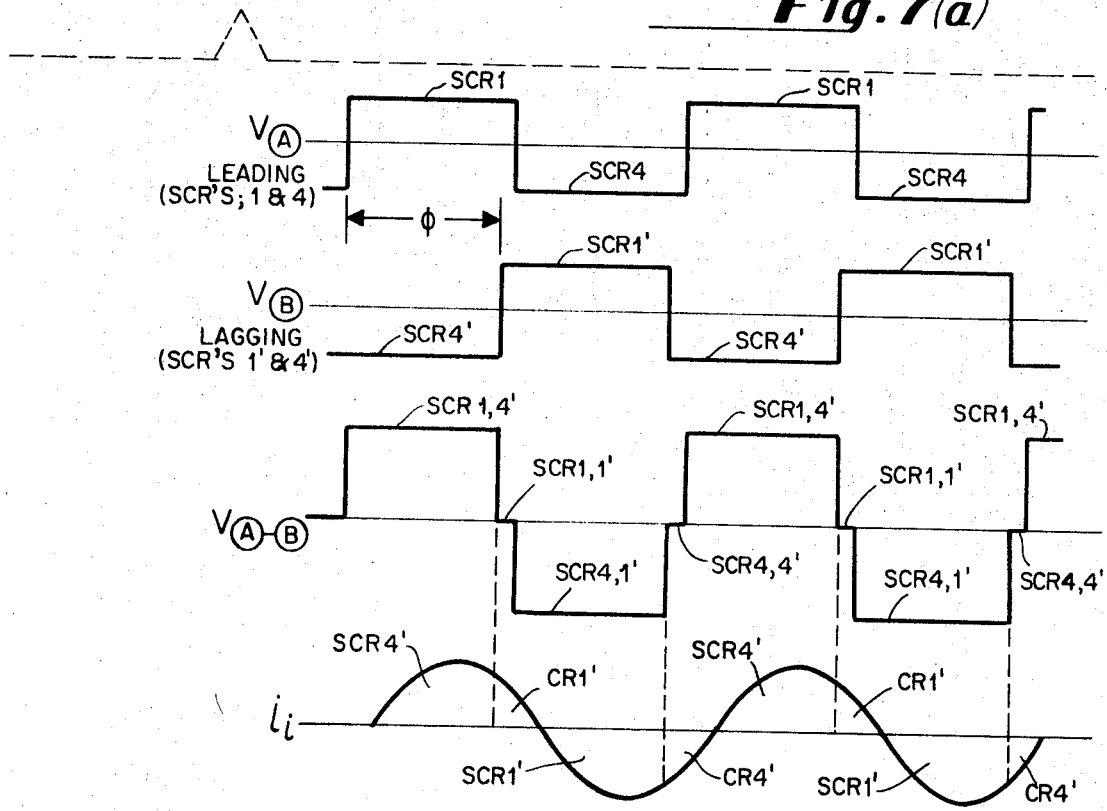
FIG. 7(b) illustrates the waveforms in the circuit of FIG. 7 under normal operating conditions.

Referring now to FIG. 7(b), the waveforms illustrated therein are the waveforms in the circuit of FIG. 7 under normal operating conditions. The magnitude of the phase displacement $\phi$ between the leading and lagging inverter half-bridges determines the magnitude of the fundamental component of the output voltage of this single phase bridge. The current waveform shown in FIG. 7(b) is partitioned and labeled as to which of the semiconductors on the lagging side carriers each portion of the current cycle.

Figure 7C:
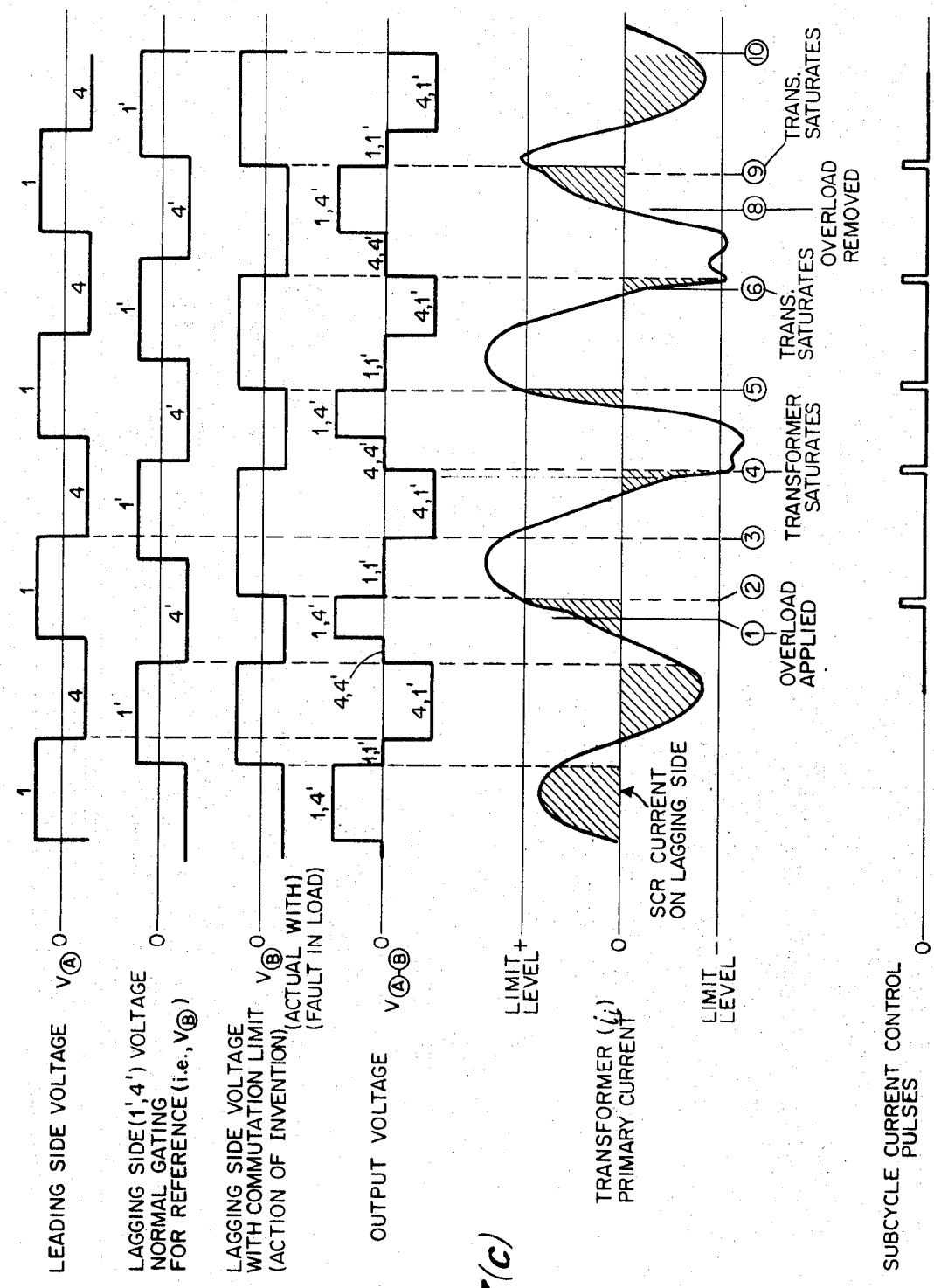
FIG. 7(c) illustrates the waveforms in the circuit of FIG. 7 when a severe overload is applied to the inverter.

FIG. 7(c) shows the waveforms in the circuit of FIG. 7 (the numerals 1,1',4,4', in the figure designate the SCR's, SCR1, SCR1', SCR4, SCR4') when a severe overload is applied to the inverter. The overload is applied at time one. At this time SCR1 and SCR4' are in conduction. The current rapidly begins to rise. At time two, the current reaches the limit level at which the subcycle current control acts. When the subcycle current control circuit senses that the current in SCR1 and SCR4' has reached the limit level, it puts out a pulse (last line of FIG. 7(c)) which causes SCR1' to begin to conduct and SCR4' to extinguish. This causes the output voltage A-B to be clamped to zero for the remainder of this half cycle. The effect of this change in A-B voltage is to lower the output voltage of the inverter on the phase which is overloaded. The manner in which this effect takes place will be discussed later. For the present, observe that the current in FIG. 7(c) does rise more slowly after time two and soon returns below the limit setting.

At time three the next half cycle starts, initiated by the normal switching of the leading SCR's, SCR1 and SCR4. At this time, the current is still slightly higher than the limit setting. The subcycle current control does not act because the current polarity disagrees with the voltage polarity. That is, the current is flowing in diodes CR4 and CR1' rather than SCR's, so there is no action from the commutation limit. When the current reverses after time 3, it does flow in a lagging SCR. Before the output load current rises to the limit setting, the output power transformer in the inverter saturates. This is due to the unsymmetrical voltage applied to this transformer due to the previous short half cycle. The saturation of this transformer places a surge current in the inverter SCR's. At time four the current in the transformer primary reaches the limit setting and the commutation limit circuit reverses the two lagging side SCR's. This removes the voltage from the saturated transformer core leg until the next half cycle.

commutation limit continues to control the action of the lagging side of the inverter to limit SCR current due to the overload, or due to transformer saturation until the overload is removed at time eight. After one more transformer saturation event, the operation of the circuit returns to normal.

Extension to a 12 Step Inverter

This concept can be applied to a multi-step inverter if the inverter can be broken down into a multitude of single phase bridge inverters. The operation is simple in concept, but may be much harder to implement than the case of one single phase inverter. Problems arise because:

1. In a stepped wave inverter with good transient dip and overshoot on load changes, filter impedance must be much smaller than that on a single phase bridge inverter. This allows fault currents to rise rapidly and requires fast action to prevent commutation failures.
2. The terminating of one power pulse in a 12 step inverter does not snap the output voltage to zero, but merely reduces it somewhat. If the fault is a single phase fault, only a few sets of thyristors may be overloaded. The voltage contributed to the faulted phase by the other thyristors will cause the current in the overloaded thyristors to continue to rise even after the power pulse is terminated on the overloaded thyristors.
3. In a multi-step inverter, many signal phase bridge inverters are cross-coupled both magnetically (by sharing the core of a multiphase transformer) and directly (by having secondaries seriesed in a complex manner). Any attempt to operate the thyristors transiently in an assymertical mode usually sets up ferroresonant interactive oscillations which are difficult to terminate.
4. Most circuits for commutating the inverter thyristors will not allow a second commutation immediately following a commutation. Should the controls ever call for such an operation of the thyristors, a commutation failure will occur.

These and other problems have made the application of an instantaneous current limit on the individual thyristors of a 12 step inverter a difficult and complex design problem in the past years.

The use of high speed digital logic, in accordance with the principles of the present invention, for the control of thyristor firing has reduced this difficult problem to an orderly design procedure. Based on the current magnitude at all thyristors and the recent history of thyristor firings, logical expressions can be written for the options which are open to the firing logic at any instant. When these logical expressions are implemented, they cause the inverter to act as though each bridge inverter were a single phase bridge acting only to protect itself from overcurrent. The actual actions are restricted by the logic to those which will not cause problems in other stages. The subcycle current control equipment consists only of this digital logic and the current detectors necessary to provide the logical inputs.

Mode of Operation

Figure 8B:
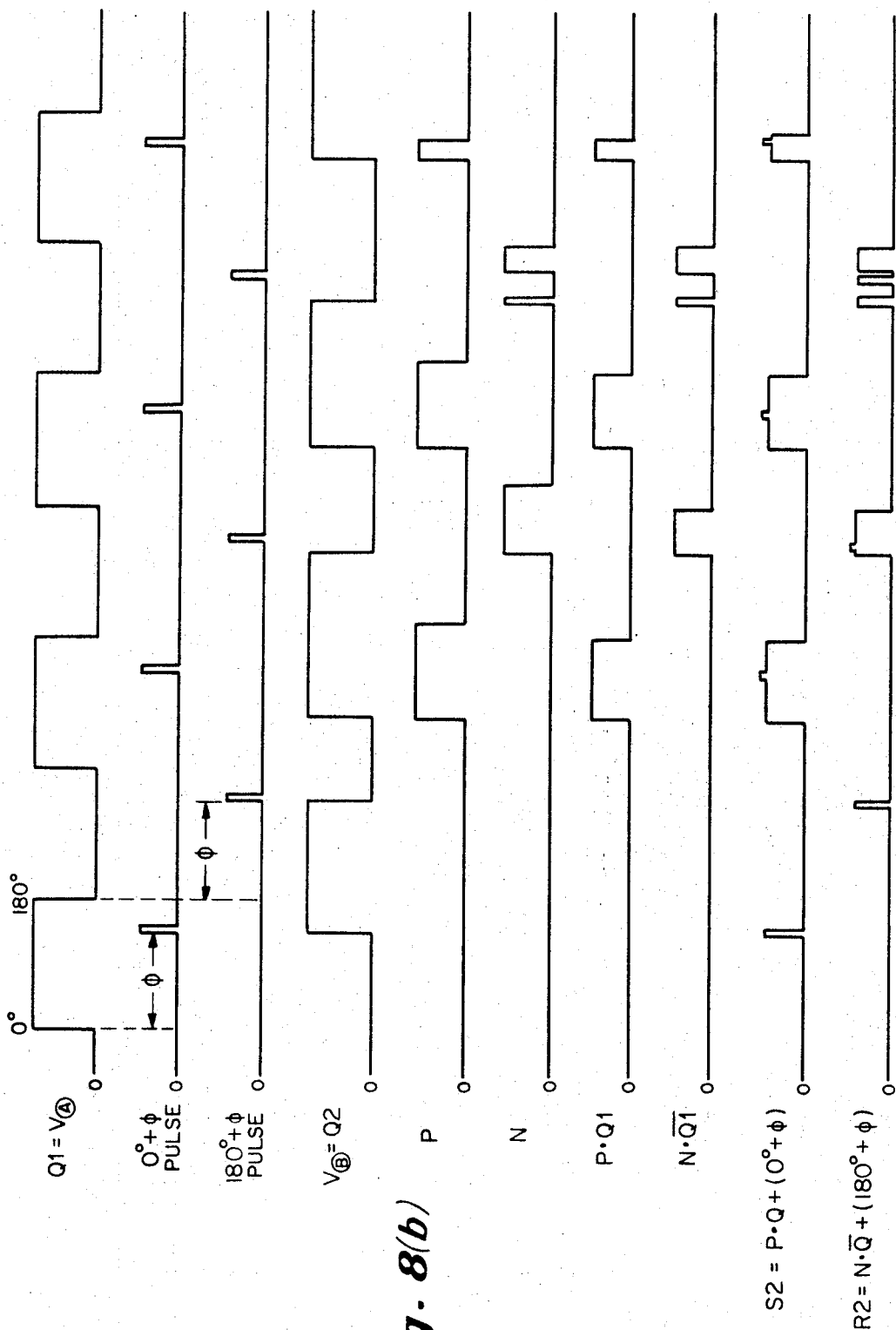
FIG. 8(b) is a timing diagram for the circuit of FIG. 8(a)

Referring to FIG. 8, there is shown the effect on the output stepped wave when a line-to-line fault is applied on phase A-B. The circled number represent the SCR's which are commutated off by the action of the subcycle current control to suppress the output voltage as shown. The unlabeled steps are normal steps of the SCR firing pattern. The resulting current waveform at the inverter output is also shown on FIG. 8. The subcycle current control acts on each SCR when the current in that SCR reaches the limit setting. The limit settings are the same number of amperes at each SCR. They appear different when observed as inverter output current because the various SCR's have different turns ratios in their output transformer windings. Thus it takes less output current to cause limting in the 30° SCR's (SCR11' to 16') than to cause limiting in the 0° SCR's (SCR1' to 6') on a line-to-line fault. The opposite is true in a line-to-neutral fault, due to the numbers of turns in the windings involved.

It can be noted on FIG. 8 that the inverter resumes its normal stepping pattern each time the output current falls below the limit value. Even though the low output current is due to a normal zero crossing of the fault current, the inverter tries to resume full output voltage. This is the only way to be able to recover from a fault in much less than a half cycle.

Implementation

FIG. 8($a$) shows one simple implementation of the subcycle current control function. FIG. 8($b$) is a timing diagram showing wave form during the operation of the circuit of FIG. 8($a$). The conduction of the four SCR's in the single phase bridge of FIG. 7 is controlled by the Q and $\bar{Q}$ outputs of the flip-flops FF1 and FF2. In normal operation of the inverter, evenly spaced timing pulses control the position of these flip-flps. When the current signal I exceeds the reference V in positive polarity, a pulse P$^+$ is generated. If FF1 is in the Q position then the limit pulse P$^+$ will change the position of FF2 to agree with that of FF1. If FF2 already agrees with FF1, then the limit signal P$^+$ will have no effect. If the P$^+$ occurs while FF1 is in the $\bar{Q}$ position then it has no effect. Similarly, the N-pulse will occur when the current signal I exceeds the reference potential V in a negative polarity. The N-pulse causes FF2 to move to agree with the position of FF1 if FF1 is in the $\bar{Q}$ position. It can be observed that the apparatus described in FIG. 8($a$) implements the mode of operation described in FIG. 7. Apparatus identical to that shown in FIG. 8($a$) would be provided for each of the current transformers CT-1 through CT-6 in a complete implementation for the circuit of FIG. 5.

FIG. 8($b$), as stated, is a timing diagram for the circuit of FIG. 8($a$) and although the operation of circuit of FIG. 8($a$) is not set forth in detail herein, the steps of operation thereof are shown in the timing diagram and may be readily understood by those skilled in the art with reference to the description of the paragraph entitled Implementation, immediately above.

Obvious Variations

The subcycle current control approach described herein can also be used in inverters where the single phase inverter which is controlled by subcycle current control does not also vary in timing to control output voltage level. The subcycle current control approach, or slight variations of it, can be used where the normal switching pattern of the single phase inverter is more complex than that shown in FIG. 7(b). The reference potential V is not necessarily a fixed potential, but may vary with the commutation capability of the inverter stage (or with any other suitable variable).

SYSTEM EFFECTS OF SUBCYCLE CURRENT CONTROL

Short Term Overloads

Figure 10:
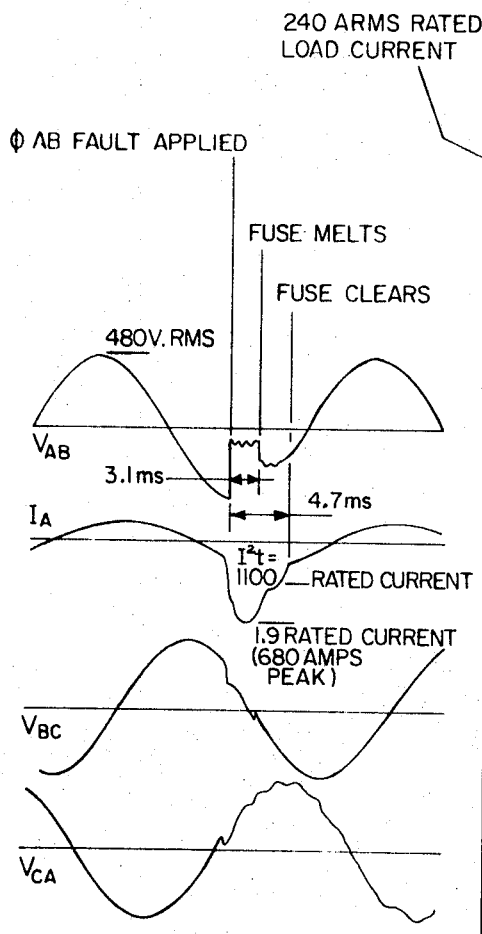
FIG. 10 illustrates details from the fault clearing test shown in FIG. 9.
Figure 9:
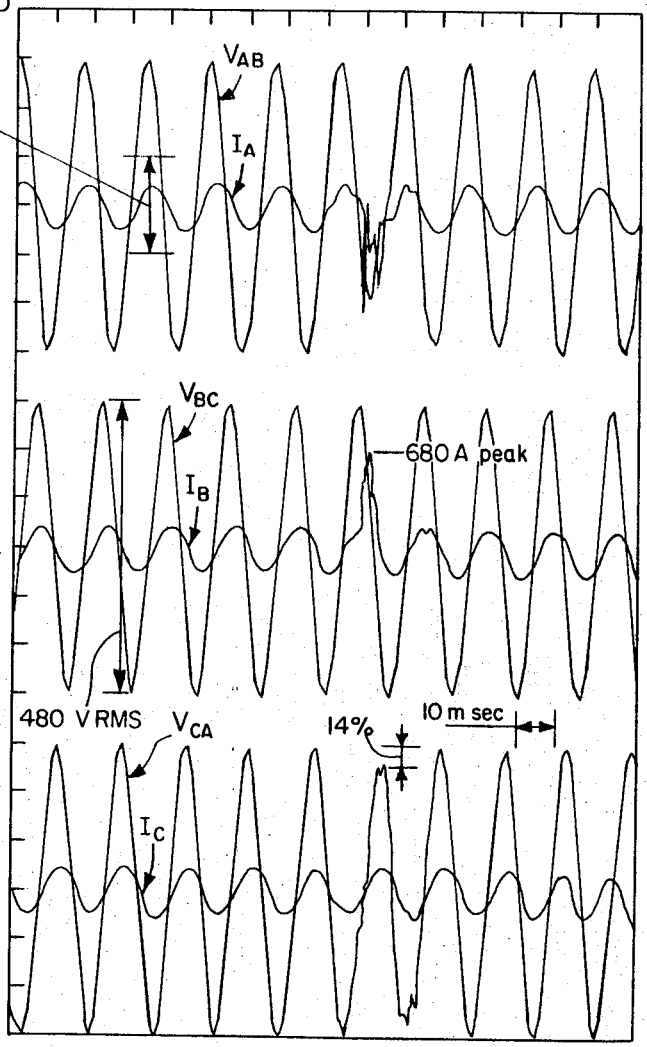
FIG. 9 illustrates three phase voltage and current showing clearing of a fault on phase AB through a fuse of 25 percent of UPS rating (100 KVA preload)

The short term overload performance of the inverter is characterized by an instantaneous current limit on each phase with instantaneous recovery to normal voltage. FIG. 9 shows a diagram oscillogram of three phase voltages and currents during a line-to-line fault on phase AB. The detail on the oscillogram is hard to follow so a section of the traces has been redrawn as FIG. 10. When the fault is applied, the current immediately rises to almost double rated value on phases A and B. Voltage on phases BC and CA is almost undisturbed. The subcycle current control depresses output voltage on phase AB to a very low value to control thyristor current while the fuse is melting. After 3.1 milliseconds the fuse melts and begins to arc. The voltage jumps up to the value of the fuse arc drop voltage immediately. After about 1 millisecond of arcing the fuse current extinguishes. Immediately the disturbance is over; all phase voltages and currents are essentially normal. Note that the duration of the voltage dip was controlled by the fuse, not by the inverter. The inverter is ready to resume full voltage immediately.

Long Term Overloads

Figure 11:
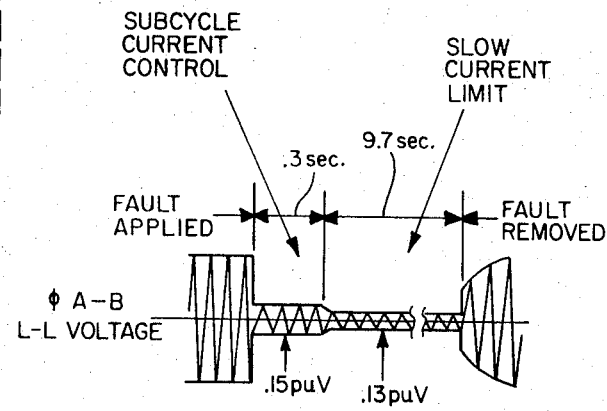
FIG. 11 illustrates a 10 second fault applied to phase AB through no protective device.

FIG. 11 is sketched from oscillographic recordings of a phase A to B line-to-line fault with no fuse or circuit breaker to remove the fault. For the first 0.30 seconds the fault current is limited only by the subcycle current control and peak current reaches twice rated. This current is delivered on the first half cycle of the fault and on all subsequent cycles for the first 0.30 seconds. Voltage on phase CA is normal; that on phase BC is depressed by 15 percent. If the fault had been removed at any time during the initial 0.30 seconds, voltage would have immediately returned to normal.

It is assumed that any protective fuses or circuit breakers will have opened by 0.30 seconds after the fault. If the overload or fault persists beyond 0.30 seconds, the slow current limit acts to gradually reduce the output voltage of all phases until the current drops low enough to cease action of the subcycle current control. This restores symmetry to the three phase output. Fault current will then be regulated at a value of 150 percent of rated inverter current by the current limit.

Upon fault removal, the voltage recovers slowly since it is recovering from the action of the slow current limit.

Inrush Loads

The response of the inverter in the case of inrush loads is to deliver all the current of which the inverter is capable, despress voltage only as much as necessary to limit current, and restore normal voltage during those portions of the cycle when the inrush current does not exceed the inverter current capability.

Figure 12:
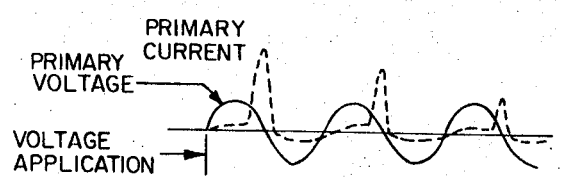
FIG. 12 illustrates current inrush on energizing a power transformer from a utility power source.

Consider for example the inrush current on energizing a large three phase transformer. The inrush current on a normal transformer may have a peak value 20 times the normal full load peak primary current. FIG. 12 shows typical traces of the voltage and current when a transformer is energized from a utility line.

Figure 3:
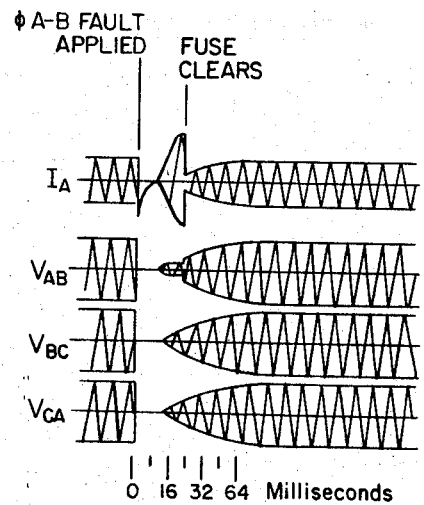
FIG. 3 illustrates a response of a typical stepped wave inverter to a line-to-line fault on phase AB. The fault is isolated by a fast fuse.
Figure 4:
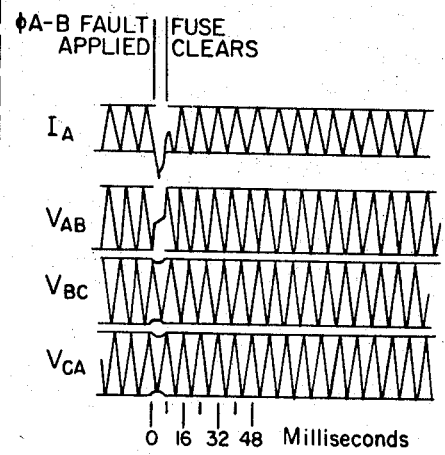
FIG. 4 illustrates a response of the inverter with subcycle current control in clearing the same fault through the same fuse as in FIG. 3.

If the source of this current was a UPS, it is likely that the current demand would cause the UPS to activate its fast current limit. The resulting voltage transient would be similar to that for a momentary fault. If the inverter current limit is of the type which acts through the regulator, the voltage dip might be as bad as that shown in FIG. 3.

Figure 13:
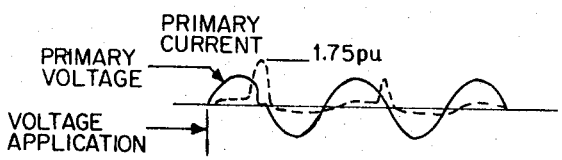
FIG. 13 illustrates current inrush on energizing a power transformer from the UPS inverter with subcycle current control.

FIG. 13 shows a typical trace of voltage and current when the inverter with subcycle fault current control supplies this inrush. The first cycle inrush causes the inverter to reduce output voltage for a portion of the cycle. This "notch" missing from the positive half cycle helps the transformer to center its flux and causes subsequent half cycles to have smaller inrush currents than would have occurred without the notch.

Figure 15:
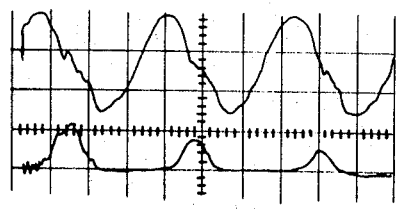
FIG. 15 illustrates a diagrammatic representation of a recorded inrush of the same 75 KVA transformer energized from the 200 KVA UPS inverter with subcycle current control. (Scales same as FIG. 14)
Figure 14:
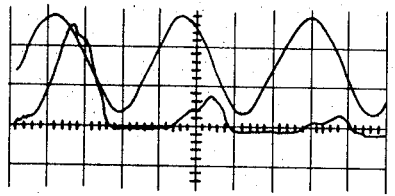
FIG. 14 illustrates a diagrammatic representation of a recorded inrush on energizing a 75 KVA transformer from a 480 volt utility power source. (Upper trace is voltage, 480 RMS. Lower trace is current, 300 amperes peak per vertical division.)

FIGS. 14 and 15 show diagrammatic records of current and voltage when a 75 KVA 480 V transformer is energized from a utility line and from the 200 KVA inverter with subcycle fault current control. FIG. 15 shows the notched voltage waveform and the transformer inrush current peak reduced from 750 amperes on the utility to 350 amperes on the inverter. Note in FIG. 15 that the voltage distortion which is caused by the limiting of inrush current does not affect the peak of any voltage cycle. Thus critical loads which were already connected when this transformer was energized should not have been disturbed by this transient.

The digitally controlled stepped wave inverter with subcycle current control is a significant improvement in trouble-free application of UPS systems to critical loads. The inverter produces unusually precise power in normal operation and the best possible response in overloads, inrush loads, and faults. In case of a fault, it provides the maximum possible fault current and minimum possible outage time. In case of inrush loads exceeding the inverter capability, it acts to limit the inrush with a minimum degradation of power quality to other loads.

The performance of this inverter is a major contribution to the solution of the problem of providing uninterruptible power to a critical load despite faults in the critical load equipment.

Having thus described my invention, I claim:

1. In combination with a three phase inverter, said inverter being characterized as comprising a plurality of single phase sub-inverters whose outputs are combined to form the total inverter output wherein the harmonic content of the total inverter output is lower than the output of one single phase sub-inverter, the improvement which comprises:

means responsive to load faults for limiting instantaneous curren in each of the sub-inverters to a predetermined value during load faults, said means being operative to limit current in the one or more subinverters in which there is an overcurrent resulting from a load fault.

2. In combination with an inverter of the type comprising a set of at least two single phase sub-inverters whose outputs are combined to form the total inverter output and, in which, the output of each of the sub-inverters is of the same frequency but at a different time phase with respect to each other such that the combined output of the sub-inverters has lower harmonic content than the output of a single sub-inverter, and wherein the voltage regulation means of the inverter causes changes in the output waveform of each subinverter such that the waveforms of the sub-inverters remain substantially identical to each other at all positions of the voltage regulating function, and further wherein, means are provided for producing control signals which control the sub-inverters and the output voltage of each of them, the improvement which comprises:

means responsive to load faults for limiting instantaneous current in each of the sub-inverters to a predetermined value during load faults, said means being operative, as required, to limit current in one or more overloaded sub-inverter of the set, said means comprising:

a. electric circuit apparatus operatively connected to each sub-inverter for sensing current at each sub-inverter;

b. detection means operatively connected to the electric circuit apparatus for detecting when the current magnitude of each sub-inverter is approaching the predetermined value; and c. electric circuit logic means operatively connected to the detection means for modifying the signals controlling the sub-inverters such as to cause the output voltage of the sub-inverters to be changed in a manner tending to reduce any overcurrent in the one or more sub-inverters in which there is an overcurrent resulting from a load fault.

3. An inverter as recited in claim 2 wherein said electric circuit apparatus comprises current transformer means.

4. In combination with a three phase inverter whose unfiltered output waveform contains no harmonics lower than the 11th, said inverter being further characterized as comprising at least one three phase transformer having primary and secondary windings, and a set of six single phase subinverters whose outputs are combined to form the total inverter output, the improvement which comprises:

means responsive to load faults for limiting instantaneous current in each of the sub-inverters to a predetermined value during load faults, said means being operative to limit current in the one or more subinverters in which there is an overcurrent resulting from a load fault.

5. An inverter as recited in claim 4 wherein said means comprise:

a. a plurality of current transformer means, each current transformer being operatively connected to a sub-inverter and each being operatively connected in circuit with the primary winding of the three phase transformer associated with each sub-inverter for sensing current at each sub-inverter in the circuit of the primary winding in each sub-inverter;

b. detector means operatively connected to each current transformer means being detecting when the current magnitude of each sub-inverter is approaching the predetermined value; and circuit c. electric circuit logic means operatively connected to the detector means for modifying the output voltage of the sub-inverters in a manner tending to reduce any overcurrent in the one or more sub-inverters in which there is an overcurrent resulting a load fault.

6. In combination with a solid state inverter utilizing silicon controlled rectifiers and of the type known as the "12 step" or "first harmonic the 11th" three phase inverter, the inverter being regulated by vector addition at the three phase transformer primary windings thereof, said inverter being further characterized as comprising a set of six single phase sub-inverters whose outputs are combined to form the total inverter output which appears across the output terminals of the three phase secondary windings of the transformer, the improvement which comprises:

a. means responsive to load faults for limiting instantaneous current in the sub-inverters to a predetermined value during a load fault, said means including:

i. a plurality of current transformer means, each current transformer bieng operatively connected to a sub-inverter and each being operatively connected in circuit with the primary winding of the three phase transformer associated with each sub-inverter for sensing current at each sub-inverter in the ciruit of the primary winding in each sub-inverter;

ii. detector means operatively connected to each current transformer means for detecting when the current magnitude of each subinverter is approaching the predetermined value; and, iii. electric circuit logic means operatively connected to the detector means for modifying the output voltage of the sub-inverters in a manner which reduces any overcurrent in the one or more sub-inverters in which there is an overcurrent resulting from a load fault.

7. In combination with an inverter of the type comprising a set of at least two single phase sub-inverters whose outputs are combined to form the total inverter output and which includes a multiphase transformer having primary and secondary windings and means to limit the instantaneous current of the sub-inverters to a predetermined value in the event of a load fault, which load fault if reflected as an overload in one or more of the sub-inverters, the improvement which comprises:

a. means for modifying the operation of one or more of the subinverters in the event of a load fault such as to limit the instantaneous current in the sub-inverters to a predetermined magnitude higher than said predetermined value during an overload in one or more of the sub-inverters, operation of such current control during a given half cycle not changing the operation of the inverter in the subsequent half cycles except as required by overcurrent conditions in said subsequent half cycles, said means including a plurality of current sensing means, each current sensing means being operatively connected to a sub-inverter and each being operatively connected in circuit with the primary winding of the multiphase transformer associated with each sub-inverter for sensing current at each sub-inverter in the circuit of the primary winding in each sub-inverter, the arrangement being such that said means is not directly sensitive to total inverter output current and the total inverter output current may be safely considerably larger than said predetermined value than if the current sensing means were located in circuit with the secondary winding of the multiphase transformer associated with each subinverter and the means to limit the instantaneous current to a predetermined value was set to limit the instantaneous current in the most overloaded subinverter.

8. An inverter as defined in claim 7 wherein said current sensing means comprise current transformer means.

9. An inverter as defined in claim 8 wherein said means further includes:
   a. detctor means operatively connected to each current transformer means for detecting when the current magnitude of each sub-inverter is approaching the predetermined magnitude; and,
   b. logic means operatively connected to the detector means for modifying the output voltage of the sub-inverters in a manner tending to reduce any overcurrent in the one or more sub-inverters in which there is an overcurrent resulting from a load fault.

* * * * *